(12) United States Patent
Yamakawa et al.

(10) Patent No.: US 8,456,682 B2
(45) Date of Patent: Jun. 4, 2013

(54) PRINT CONTROL APPARATUS AND PRINT CONTROL METHOD

(75) Inventors: Junichi Yamakawa, Hiratsuka (JP); Nobuhiro Kawamura, San Mateo, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 377 days.

(21) Appl. No.: 12/922,144

(22) PCT Filed: Apr. 23, 2009

(86) PCT No.: PCT/JP2009/058532
§ 371 (c)(1),
(2), (4) Date: Sep. 10, 2010

(87) PCT Pub. No.: WO2009/131247
PCT Pub. Date: Oct. 29, 2009

(65) Prior Publication Data
US 2011/0007359 A1 Jan. 13, 2011

(30) Foreign Application Priority Data

Apr. 24, 2008 (JP) ................................ 2008-113902
Jun. 20, 2008 (JP) ................................ 2008-162308

(51) Int. Cl.
*G03G 15/00* (2006.01)
*G06F 3/12* (2006.01)

(52) U.S. Cl.
USPC .......................................... 358/1.15; 399/24

(58) Field of Classification Search
USPC .................. 358/1.9, 1.15; 399/27, 35; 347/5, 347/7, 14, 30
See application file for complete search history.

(56) References Cited

U.S. PATENT DOCUMENTS

| | | | |
|---|---|---|---|
| 5,383,129 A | 1/1995 | Farrell | |
| 6,356,359 B1 | 3/2002 | Motamed | |
| 6,977,747 B1 | 12/2005 | Matsukubo et al. | |
| 7,564,584 B2 | 7/2009 | Takahashi et al. | |
| 7,850,263 B2 * | 12/2010 | Shinada et al. | 347/7 |
| 8,295,719 B2 * | 10/2012 | Nagasu et al. | 399/35 |
| 2001/0003457 A1 * | 6/2001 | Doi | 347/5 |
| 2003/0020951 A1 | 1/2003 | Minowa | |
| 2003/0214542 A1 * | 11/2003 | Yoshida et al. | 347/7 |
| 2006/0055956 A1 | 3/2006 | Takahashi | |
| 2006/0139422 A1 * | 6/2006 | Hatasa et al. | 347/86 |

(Continued)

FOREIGN PATENT DOCUMENTS

| | | |
|---|---|---|
| JP | 7181850 A | 7/1995 |
| JP | 2003025686 A | 1/2003 |

(Continued)

OTHER PUBLICATIONS

PCT International Search Report and Written Opinion of the International Searching Authority, mailed Apr. 8, 2009, in PCT/JP2009/058532.

(Continued)

*Primary Examiner* — Jerome Grant, II
(74) *Attorney, Agent, or Firm* — Fitzpatrick, Cella, Harper & Scinto

(57) ABSTRACT

An external controller predicts and calculates a toner consumption amount of each page before printing by using image data after development. The consumption amount is predicted in consideration of an image process in a printer and a designation of a variable print.

13 Claims, 15 Drawing Sheets

U.S. PATENT DOCUMENTS

| | | |
|---|---|---|
| 2006/0203277 A1 | 9/2006 | Suzuki |
| 2006/0245770 A1* | 11/2006 | Choi ............................... 399/27 |
| 2007/0109587 A1 | 5/2007 | Yamakawa |
| 2009/0009803 A1* | 1/2009 | Takeuchi et al. ............. 358/1.15 |
| 2010/0073419 A1* | 3/2010 | Nishizaka et al. .............. 347/30 |
| 2010/0097420 A1* | 4/2010 | Nishizaka et al. .............. 347/14 |
| 2011/0007359 A1* | 1/2011 | Yamakawa et al. .......... 358/1.15 |
| 2011/0026948 A1* | 2/2011 | Nagasu et al. .................. 399/35 |
| 2011/0310406 A1* | 12/2011 | Monner et al. ................. 358/1.9 |

FOREIGN PATENT DOCUMENTS

| | | |
|---|---|---|
| JP | 2003228474 A | 8/2003 |
| JP | 20040177884 A | 6/2004 |
| JP | 2005-250302 | 9/2005 |
| JP | 20060082262 A | 3/2006 |
| JP | 2006281497 A | 10/2006 |
| JP | 2007323463 A | 12/2007 |

OTHER PUBLICATIONS

Japanese Office Action dated Mar. 22, 2012 issued during prosecution of related Japanese application No. 2008-162308. (Whole English-language translation included).

European Search Report dated May 15, 2012 issued during prosecution of related European application No. 09734921.1.

Chinese Office Action dated Mar. 29, 2012 issued during prosecution of related Chinese application No. 200980114764.0 (whole English-language translation included).

* cited by examiner

FIG. 15

POD PRINT ESTIMATION

FILE   EDIT   VIEW   FAVORITES   TOOLS   HELP

BACK ▼ | ▶ ▼ | ✕ | ↻ | 🏠 | 🔍 SEARCH | 🖨

ADDRESS: http:// 192.168.100.21/mitsumori.htm

■ POD ESTIMATION          REQUESTER | LOG-OUT

■ ESTIMATION RESULT

【ARRIVAL FILE】 (1502)

| ARRIVAL FILE NAME | THE NUMBER OF PAGES |
|---|---|
| 1. SIMPLE GUIDE.pdf | 12 PAGE |

【ESTIMATING CONDITIONS】 (1503)

| FINISHED SIZE | A4(210mm×297mm) |
|---|---|
| COPIES | 80 |
| BINDING TYPE | MIDDLE |
| FRONT COVER SHEET | THE SAME AS TEXT |
| TEXT SHEET | COATING SHEET (120gsm) |

【ESTIMATED CHARGE】

| | | |
|---|---|---|
| 1504 — PAGE CHARGE | 2,400 | YEN |
| 1505 — BASIC CHARGE | 840 | YEN |
| 1506 — PRINT FEE | 47,230 | YEN |
| 1507 — SHEET CHARGE | 720 | YEN |
| 1508 — POST-MODIFICATION CHARGE | 5,600 | YEN |
| 【TOTAL】 | 56,790 | YEN |

FIG. 16

POD PRINT ESTIMATION

FILE   EDIT   VIEW   FAVORITES   TOOLS   HELP

BACK ▼ | ▼ | ✕ | ↻ | 🏠 | 🔍SEARCH | 🖨

ADDRESS http:// 192.168.100.21/mitsumori.htm

■ POD ESTIMATION                                    REQUESTER | LOG-OUT |
■ ESTIMATION RESULT

【ARRIVAL FILE】

| ARRIVAL FILE NAME | THE NUMBER OF PAGES |
|---|---|
| 1. SIMPLE GUIDE.pdf | 12 PAGE |

【ESTIMATING CONDITIONS】

| FINISHED SIZE | A4(210mm×297mm) |
|---|---|
| COPIES | 80 |
| BINDING TYPE | MIDDLE |
| FRONT COVER SHEET | THE SAME AS TEXT |
| TEXT SHEET | COATING SHEET (120gsm) |

【ESTIMATED CHARGE】

| PAGE CHARGE | 2,400 | YEN |
|---|---|---|
| PRINT FEE | 52,800 | YEN |
| CONTENTS ADJUSTMENT | -820 | YEN |
| SHEET CHARGE | 720 | YEN |
| POST-MODIFICATION CHARGE | 5,600 | YEN |
| 【TOTAL】 | 60,700 | YEN |

1601 — (window)
1602 — 【ARRIVAL FILE】
1603 — 【ESTIMATING CONDITIONS】
1604 — PAGE CHARGE
1605 — PRINT FEE
1606 — CONTENTS ADJUSTMENT
1607 — SHEET CHARGE
1608 — POST-MODIFICATION CHARGE

| COSTS DEFINITION | ? □ × |

FILE    EDIT    VIEW    FAVORITES    TOOLS    HELP    ......

BACK▼  →▼  ×  ⟳  ⌂  SEARCH  🖨

ADDRESS | http:// 192.168.100.21/costdet.htm ▼

■ COSTS DEFINITION SETTING    REQUESTER | LOG-OUT |

■ BASIC INFORMATION

1702 — 【APPARATUS INFORMATION】

| NAME | MFP104 | ID: | 235 |
| PRODUCT NAME | MFP2008 ▼ | ⦿ COLOR ○ MONO-CHROMATIC ○ WIDE |
| PRINT SPEED | 75 | SHEETS/min |

【MANAGEMENT INFORMATION】

| COSTS CENTER | 1856 | ADMINISTRATOR IN CHARGE | ICHIRO SUZUKI |

1703 — ■ COSTS DEFINITION

| BASIC CHARGE FOR ADMINISTRATION | 24,000 | SPOT CHARGE/TIME | 8,800 |
| 1704 — COLOR COUNT | 27.5 | MONOCHROMATIC COUNT | 5.5 |
| 1705 — TONER (CMY) | 25,600 | TONER (K) | 40,600 |
| WORKING RATIO | 56.8 | | |
| 1706 — COVERAGE (K) | 7.8 | COVERAGE (K) | 2.3 |
| ANNUAL WORKDAYS | 260 | WORKING TIME PER DAY | 10 |
| APPARATUS COSTS/ SHEET | 1.52 | WORKING EXPENSES/ SHEET | 0.65 |

EDIT

......

PRINT CONTROL APPARATUS AND PRINT CONTROL METHOD

TECHNICAL FIELD

The invention relates to a print control apparatus for managing costs regarding printing in an image forming apparatus, its control method, and the like.

BACKGROUND ART

In a commercial printing industry, hitherto, a printing company receives a request for making printed matter (magazine, newspaper, catalog, advertisement, gravure, etc.) from the third party (customer, client), makes a client-desired printed matter, and delivers it, thereby obtaining a compensation from the client.

In such an industry, even at present, it is a main stream that a large-scaled printing apparatus or the like such as an offset photoengraving printer is used. In this instance, the operation has been progressed by executing various steps such as sending of a manuscript, design or layout, comp (presentation by a printer output), proofreading (layout correction, color correction), proof sheet (proof print), black copy formation, printing, postprocessing modification, and delivery. This is because of the following reasons. When using such a printer as mentioned above, the black copy formation is indispensable, once the black copy has been formed, its correction is not easy, and it is fairly disadvantageous in terms of costs, so that careful proofreading, that is, a check of the layout and a color confirming operation are indispensable, or the like. As mentioned above, in such an industry, a large-scaled apparatus is necessary and it also takes time of a certain extent to make the printed matter which the client desires.

On the other hand, in recent years, the realization of a high speed and high picture quality of a printer of an electrophotographic system or an ink jet system has been progressing. Therefore, in opposition to such a printing industry as mentioned above, a market using a digital image forming apparatus such as digital copying apparatus or MFP (Multi Function Peripheral) called a Print On Demand (hereinbelow, abbreviated to POD) is also growing.

In the POD market, it is intended that a job of a relatively smaller lot than a job which is handled by the large-scaled printer can be handled in a short delivery date without using a large-scaled apparatus or system. Printing using electronic data is realized by maximally utilizing, for example, the digital image forming apparatus in place of such a large-scaled printer as mentioned above. In such a POD market, digitization has been progressed as compared with the conventional printing industry and in the steps until the delivery after the sending of the manuscript from the client, management and control using a computer have permeated.

In the POD market, a PFP (Print For Pay) as a print service in a print shop or the like, a CRD (Centralized Reproduction Department) as a print service for an enterprise, and the like exist.

In the foregoing printing industry and POD market, there is also provided such a service that printed matter is assumed to be goods and all businesses including a packing, a delivery, after services, an inventory management, and a deposit management as well as ordering/acceptance of the goods are acted in a lump as a proxy. Further, there is also examined such a system that a management schedule and a management business are supported through a collection, a modification, and a report of related data, information is accumulated, and the information can be provided to a necessary place of duty as necessary.

On the other hand, there has been a method hitherto whereby print costs regarding the printing are managed. For example, a system for estimating costs of print materials prior to a printing process has been disclosed in Japanese Patent Application Laid-Open No. H07-181850. According to the system, the overall print material costs are decided from count values (the number of sheets, etc.) of the print materials which are used in the designated printing process and a unit cost per print material type (sheet type, etc.) which is derived from a database. Such a print system that prior to starting a print job, the user is made to recognize total costs necessary for the print job has been disclosed in Japanese Patent Application Laid-Open No. 2003-228474. Further, such a print cost calculating system that print costs are calculated from a consumption amount of ink which is consumed by a printer based on digital image data has been disclosed in Japanese Patent Application Laid-Open No. 2003-025686.

In the POD market, as printing utilizing a feature of the POD printing, attention is paid to a One to One marketing represented by direct mail and attention is also paid to variable printing which can provide printed matter which has individually been customized so as to satisfy customer's needs. In the variable printing here, variable information which differs every record is fed to fixed information corresponding to the record and the printing is performed, so that output matter which has partially been customized can be easily produced. There is a hot folder as one of methods of entering the print job in the POD print system. As such a type of hot folder, there is a hot folder in which data described in a format of PPML (Personalized Print Markup Language) of a print language limited for the variable printing can be used as input data. There is a case where data of a plurality of pages is included per record. That is, if the fixed information and the variable information of one page exist per record, the printing of one record becomes the printing of synthetic data of the fixed information and the variable information of one page.

Like a technique as mentioned above, when a charge amount is calculated for the printing, not only the charge amount is calculated according to the number of print sheets every color/monochromatic/sheet size, but also the charge amount according to a use amount of the toner or the like is calculated. This means that for the printing company for executing the POD printing, even for the printed matter using a color at one point, a color print fee is not charged but a money amount according to the actual use amount of the toner or the like can be charged to the customer.

However, in the case of using a toner-based charging system, the toner consumption amount differs every page of the printed matter and its print fee also differs. At this time, since the method different from the simple charge amount calculation is used, such a system that the toner consumption amount is precisely predicted and the print costs based on the prediction, a prediction result of each page, and the like are presented to the customer prior to printing, thereby asking the customer to understand is demanded.

There is also such a problem that in the prediction of the toner consumption amount, in such variable printing as to handle a large quantity of pages, since the contents of the variable information differ every record, it takes long time to predict the toner consumption amount for each page.

DISCLOSURE OF THE INVENTION

It is, therefore, an object of the invention to provide a system which can precisely predict a toner consumption amount and can present a prediction value to the user prior to printing.

To solve the above problems, according to the invention, there is provided a print control apparatus for predicting a consumption amount of toner in printing in an image forming apparatus, comprising: a development unit that develops a print job in which the printing in the image forming apparatus has been instructed into image data; a prediction unit that analyzes the image data obtained by being developed by the development unit and predicts the consumption amount of the toner in the printing; and an output unit that outputs a consumption amount of the toner which is consumed by the print job based on the consumption amount of the toner predicted by the prediction unit and a consumption amount of the toner of each page included in the print job.

Further features of the present invention will become apparent from the following description of exemplary embodiments with reference to the attached drawings.

BRIEF DESCRIPTION OF THE DRAWINGS

FIG. 15 is a diagram illustrating an estimation display of a toner-based charging system in the embodiment of the invention.

FIG. 16 is a diagram illustrating an estimation display of a toner adjusting system in the embodiment of the invention.

FIG. 17 is a diagram illustrating a costs definition setting in the embodiment of the invention.

BEST MODE FOR CARRYING OUT THE INVENTION

Preferred embodiments of the present invention will now be described in detail in accordance with the accompanying drawings.

First Embodiment

A best mode for carrying out the invention will be described hereinbelow with reference to the drawings.
(System Construction)

Figure 1:
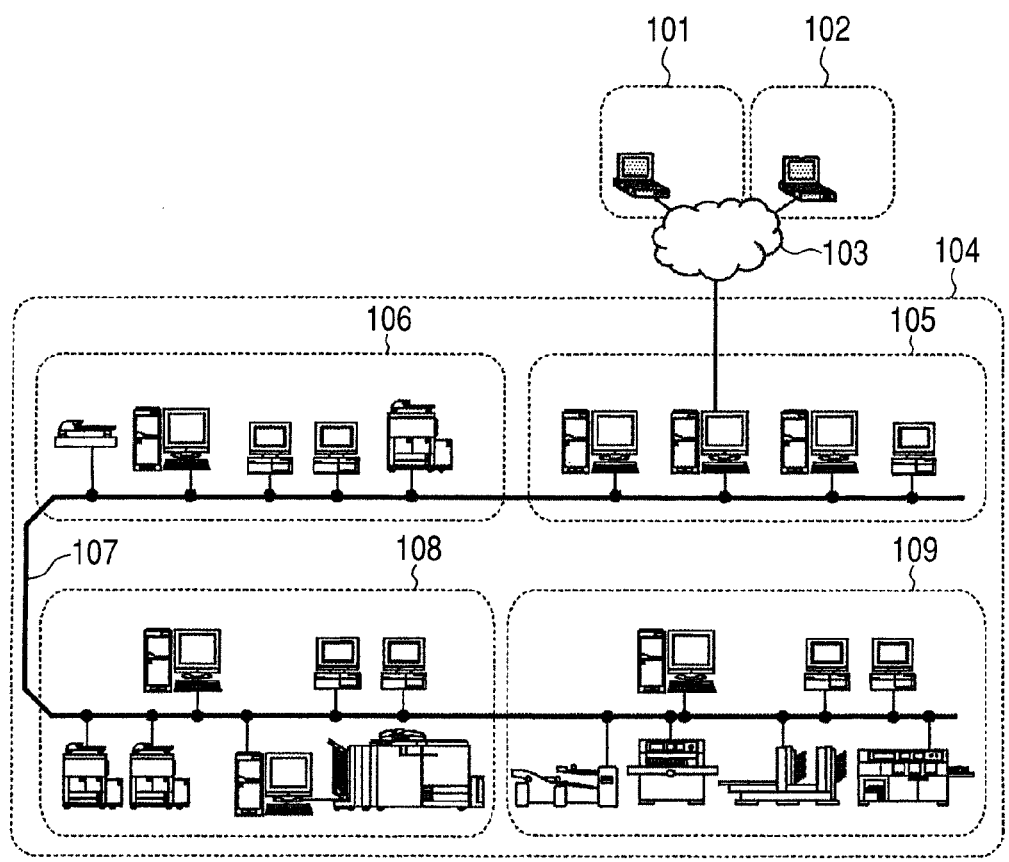
FIG. 1 is a constructional diagram of a whole system of an embodiment of the invention.

FIG. 1 is a block diagram illustrating an example of a fundamental construction of a whole system.

This block diagram is constructed by: one or a plurality of end user environments 101 and 102; and a POD site environment 104 connected through an Internet 103.

An orderer who requests an ordering of a print exists in each of the end user environments 101 and 102. A status confirmation of a job, a confirmation of an estimation of a print fee, and the like as well as a request for the print job can be performed from each of the end user environments (the end user environment A 101 and the end user environment B 102 here) by using each client PC.

The POD site environment 104 is constructed by four steps of a process control unit 105, a prepressing unit 106, a digital print unit 108, and a postpressing unit 109. They are connected by a network 107.

The process control unit 105 instructs work to each step of the process control unit 105, prepressing unit 106, digital print unit 108, and postpressing unit 109 in the POD site environment 104. This unit is a portion for unitarily managing a work flow of the system constructed by a computer or various kinds of devices. In this portion, print costs are calculated and managed, jobs are received from the end users, and the jobs from the end users are stored. Based on a designation of the job from the end user, the work in each step is assembled as a work flow and the operation in each device or each worker is efficiently scheduled.

Based on a working instruction of a prepressing job received from the process control unit 105, the prepressing unit 106 scans a paper original document received from the end user by using a scanning device such as scanner or MFP (Multi Function Peripheral). The prepressing unit 106 inputs the scanned image as a scan image file into a prepressing server or a client PC and, at the same time, executes an image correction, a merging of the file, an insertion/deletion of a page, various page layout editions, and a page layout process. The unit 106 executes a proof output for confirming a layout and a color tone of a final product as necessary.

In response to a working instruction of a print job received from the process control unit 105 or the prepressing unit 106, the digital print unit 108 copies the paper original received from the end user by a monochromatic MFP, a color MFP, or the like. A document/image file received from the end user, the scanned image file, or its edited document/image file is printed by a print device such as monochromatic MFP or color MFP through a printer driver or hot folder from the client PC.

The postpressing unit 109 controls postprocessing devices such as sheet folding machine, saddle stitch binding machine, case binding machine, cutting machine, enclosing machine, and collator according to a working instruction of a postpressing job received from the process control unit 105, prepressing unit 106, or digital print unit 108. The unit 109 executes a finishing process such as sheet folding, saddle stitch binding, case binding, cutting, enclosing, and collation to recording paper which has been output from the digital print unit.
(System Construction of Process Control Unit)

Figure 2:
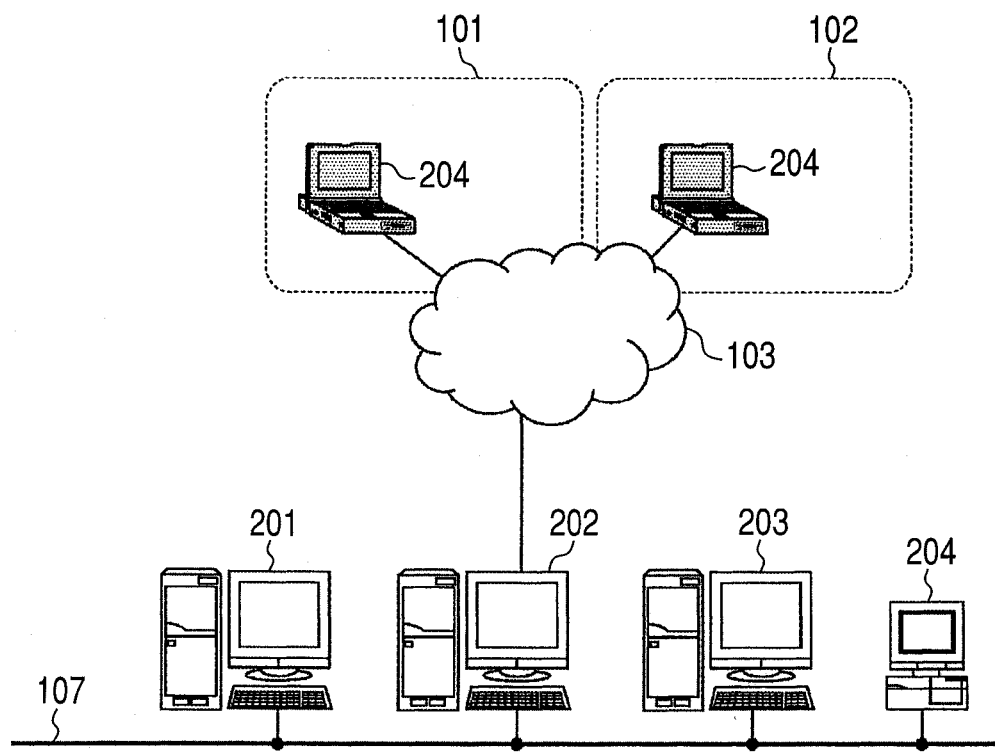
FIG. 2 is a system constructional diagram of a process control unit in the embodiment of the invention.

FIG. 2 is a block diagram illustrating an example of a construction of the process control unit 105.

The process control unit 105 is constructed by an MIS (Management Information System) server 201, an accepting server 202, a file server 203, a client PC 204, and the like connected to the network 107.

The MIS server 201 is a server in a system for managing a work flow for the businesses of the whole system which are executed until the delivery after the acceptance and integratedly managing various kinds of management information and sales information. In the MIS server 201, a management of stocks of the sheets and toner, calculation of an estimated price from a prediction value of the toner consumption amount of the accepted print job, a management of cost data for calculating an estimation, and the like.

The accepting server 202 is a server for receiving the jobs from the end user environments 101 and 102 by using the Internet 103. The received jobs are managed by ID numbers of the jobs. The ID numbers and information necessary for management are transmitted to the MIS server 201. The server 202 has a role for transferring those ID numbers and information to downstream steps together with other information such as image data in response to an instruction of the MIS server 201.

The file server 203 is a document management server for storing the jobs received from the end users in order to prepare for re-ordering based on the same original from the end users. Generally, the image data and the setting information (job tickets) of the jobs at the time of the previous output have been stored together.

The information which is transmitted and received among the MIS server 201, accepting server 202, file server 203, and client PC 204 in the process control unit 105 is called JDF (Job Definition Format). The working instructions of the jobs, a history of each step, and the like can be disclosed in the JDF. A total work flow automatization is provided by interlocking with the prepressing unit 106, digital print unit 108, postpressing unit 109, and the like around the process control unit 105 as a center by transferring the jobs and issuing control commands.

(System Construction of Prepressing Unit)

Figure 3:
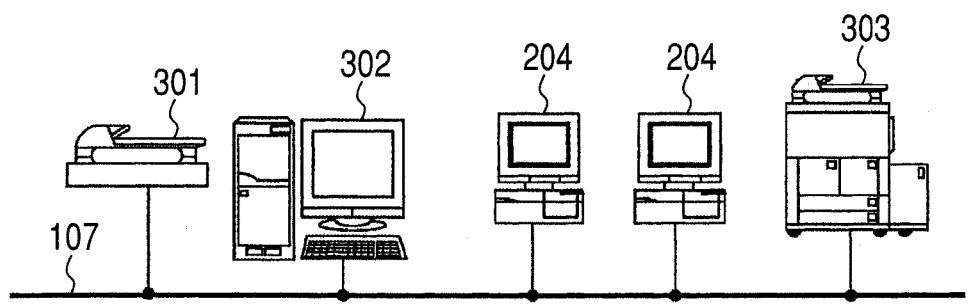
FIG. 3 is a system constructional diagram of a prepressing unit in the embodiment of the invention.

FIG. 3 is a block diagram illustrating an example of a construction of the prepressing unit.

A prepressing server 302 scans the paper originals received from the end users by a scanning device such as scanner 301/MFP 303 or the like and fetches as scan image files. The server 302 also executes such various kinds of page layout editions and imposition processes.

The various kinds of page layout editions includes an image correction such as skew correction, black point removal, or the like, merging a plurality of document/image files received from the end users or a plurality of scan image files scanned by the scanning device, inserting a page, deleting a page, and adding a page number or an annotation, inserting an index paper, a front cover, and an insert sheet. Moreover, the imposition processes include an N-up print and a page repeat print.

As a construction of the prepressing unit 106, the unit 106 can be constructed by one prepressing server 302 and a plurality of client PCs 204 as illustrated in the diagram or may be constructed only by a plurality of client PCs 204 without using the prepressing server 302.

If the job received from the end user is a copy job, first, the operator scans the paper original by the scanning device such as scanner 301/MFP 303 or the like and fetches as a scan image file into the prepressing server or client PC. If the fetched scan image was obliquely inclined, the skew of the scan image is corrected by executing a skew correcting process. If the fetched scan image has punching holes or dust, the punching holes or dust of the scan image can be also removed by executing a black point removing process. If the job received from the end user is a print job, first, the operator fetches the document/image file received from the end user into the prepressing server 302 or the client PCs 204.

If a plurality of document/image files received from the end user and a plurality of scan image files scanned by the scanning device exist, those files are merged.

In addition, there is a case where the document/image files received from the end user and the scan image files scanned by the scanning device are further edited. For example, the operator inserts a page from another file into the edition target file or deletes the page of the edition target file while confirming a layout of a plurality of pages. For example, the operator adds the page number or annotation (a watermark showing secret information or characters or an image of a logo or the like) or designates the N-up print or page repeat print (printing in which a plurality of pages are arranged onto one print surface). Such various kinds of page layout editions and page layout process that the index paper, front cover, and insert sheet are inserted, a postprocess such as stapling, punching, Z-folding, or the like is designated, and the like are executed.

In the prepressing unit 106, in order to realize the One to One marketing such as address printing of the direct mail or pamphlet per customer, it is interlocked with the database constructed in the prepressing server or another server. A variable print system in which while printing a plurality of copies of the same document, the addresses and related data are replaced and printed can be also constructed.

In the printing industry, there is an output called a color comp (Color Comprehensive Layout) having an object to make a presentation to an advertiser prior to starting the photoengraving/printing steps. In recent years, a color hard copy in which a digital color image processed by a DTP (DeskTop Publishing) for producing a publication by using a personal computer or a CEPS (Color Electronic Prepress System) which is used for correction, synthesis, or the like of an image in a printing step has been output by a color printer such as a color MFP or a color plotter is used in the foregoing color comp.

In the POD using a printer such as an MFP, a layout confirmation corresponding to the comp and a simple color tone confirmation or a detailed color tone confirmation corresponding to a proof are included and the image can be proof output by the same color printer such as a color MFP.

In the prepressing unit 106, the image can be also proof output to the MFP in order to confirm a layout and a color tone of such a final product as necessary.

The prepressing server 302, client PC 204, scanner 301, and MFP 303 in the prepressing unit 106 are connected by the network 107. The jobs received in the prepressing unit 106 are processed by transferring the jobs or issuing the control commands.

(System Construction of Digital Print Unit)

Figure 4:
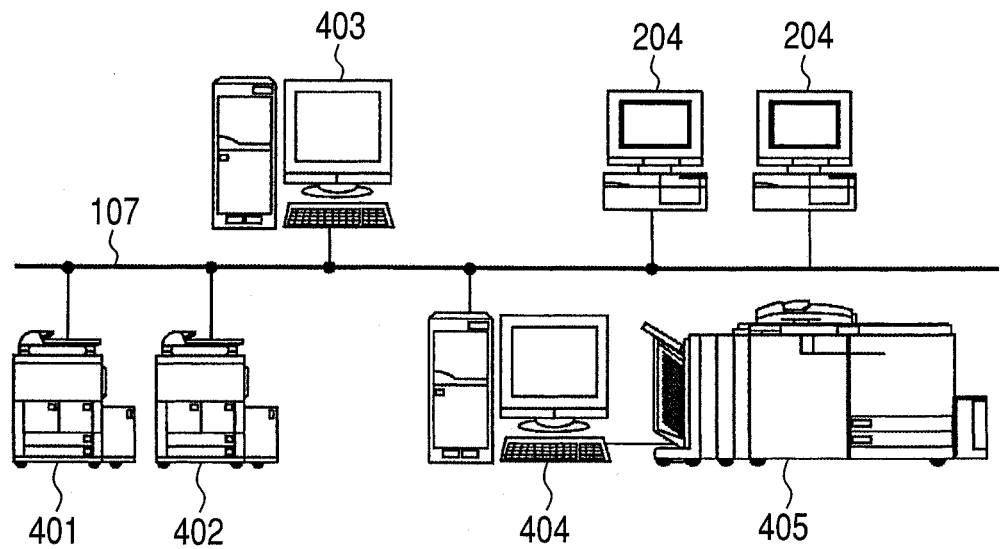
FIG. 4 is a system constructional diagram of a digital print unit in the embodiment of the invention.

FIG. 4 is a block diagram showing an example of a construction of the digital print unit 108.

One or a plurality of print servers 403, one or a plurality of client PCs 204, one or a plurality of color MFPs 401, one or a plurality of monochromatic MFPs 402, and one or a plurality of high-speed color MFPs 405 are connected to the network and exist.

The print server 403 has two roles. One is transmission and reception of information to/from the outside of the digital print unit 108. First, image information, setting information, and the like of the entered job are input to the print server 403. The print server 403 has a role for notifying the outside of information such as a status and the like when the job is finished. The other is management control in the digital print unit 108 and the jobs which were input from the outside and the jobs which were generated in the digital print unit 108 are unitarily managed by the print server 403. In this server, all of the devices in the digital print unit 108 and situations of all of the jobs can be monitored and a temporary stop, a setting change, and a print restart of the job or a copy, a movement, a deletion, and the like of the job can be controlled.

The client PC 204 has: a role for editing an application file which was input, instructing the printing, or entering a print-ready file; and a role for assisting the monitoring and control of the devices and jobs which are managed in the print server 403.

Each of the color MFP 401, the monochromatic MFP 402, and the high-speed color MFP 405 is an image forming apparatus having various functions such as scan, print, and copy. Since speeds, costs, and the like of the color MFP 401, monochromatic MFP 402, and high-speed color MFP 405 differ, it is necessary to selectively use them according to their uses. An external controller 404 as a print control apparatus for executing an RIP at a high speed is connected to the high-speed color MFP 405. The external controller 404 predicts the toner consumption amount simultaneously with the execution of the RIP of the print job and transmits a prediction result to the MIS server 201. For example, the functions which the print servers 403 and the external controller 404 have may be realized as one print control apparatus and they may be connected to each image forming apparatus and client PC.

(System Construction of Postpressing Unit)

Figure 5:
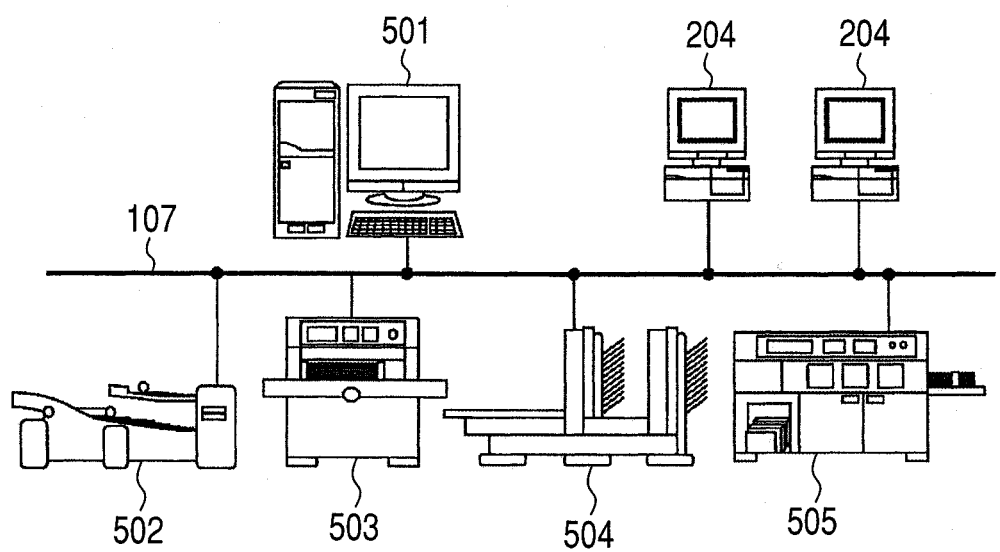
FIG. 5 is a system constructional diagram of a postpressing unit in the embodiment of the invention.

FIG. 5 is a block diagram showing an example of a construction of the postpressing unit.

The postpressing unit 109 is constructed by: a postpressing server 501; client PCs 204; and postprocessing apparatuses represented by a sheet folding machine 502, a cutting machine 503, a saddle stitch binding machine 504, and a case binding machine 505.

First, the postpressing server 501 is a computer for integratedly managing postprocessing steps. Based on an instruction of the job accepted in the accepting server 202, an instruction of the job issued from the MIS server 201, or the like, the server 501 produces postprocessing conditions by which an image can be finished in the postpressing unit 109 and instructs a postprocessing (finishing process) step as requested by the end user. Generally, the postpressing server 501 exchanges information with the outside of the postpressing unit 109 by using an information exchange unit such as a JDF and exchanges a command or a status with the postprocessing apparatus within the postpressing unit 109.

The postprocessing step executed by the postprocessing apparatuses includes: a cutting processing step; a saddle stitch binding processing step; a case binding processing step; a sheet folding processing step; a punching processing step; an enclosing processing step; a collating processing step; and the like. The postprocessing apparatuses execute, as the postprocessing step, various sheet working processes to the recording paper printed by the image forming apparatus such as an MFP so as to be modified into a booklet form which is provided to the end user.

As postprocessing apparatuses which are managed by the postpressing server 501, besides the sheet folding machine, cutting machine, saddle stitch binding machine, and case binding machine illustrated in the diagram, there are various apparatuses including a stapler, a punching machine, an enclosing machine, and collating machine (collator). The postpressing server 501 grasps situations of those postprocessing apparatuses and situations of the jobs by those postprocessing apparatuses by a sequential polling or the like according to a predetermined protocol and manages executing situations of the jobs. The embodiment may have a construction in which a plurality of sheet processes mentioned above can be executed by different sheet processing apparatuses or a plurality of kinds of sheet processes can be executed by one sheet processing apparatus. The embodiment may also have a construction in which the system has any one of a plurality of sheet processing apparatuses.

(System Functional Block)

Figure 6:
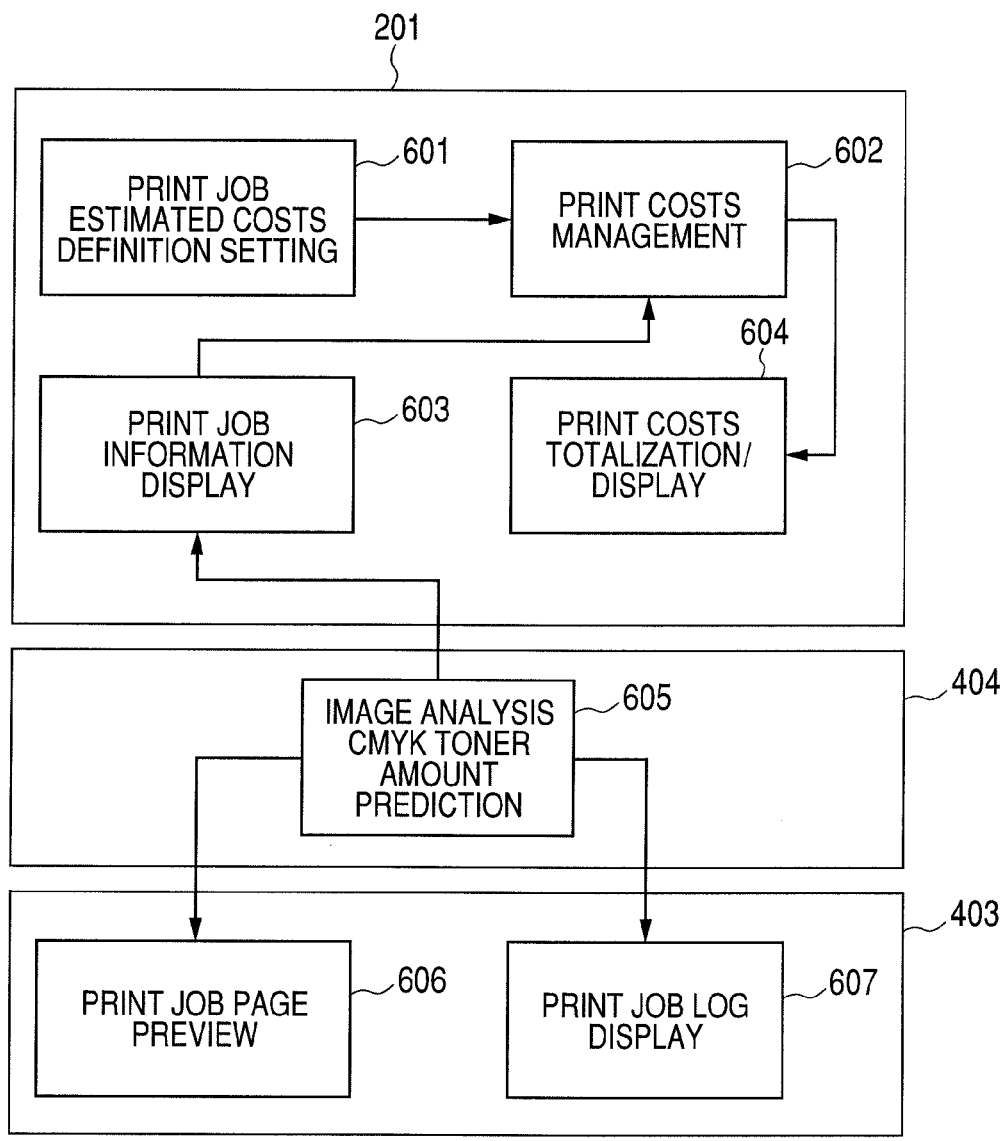
FIG. 6 is a system functional block diagram block diagram in the embodiment of the invention.

A system functional block of the present system is illustrated in FIG. 6. In a print job estimated costs definition setting 601, costs per toner type, sheet type, and finishing type are defined. In a print costs management 602, a print costs management is made based on the prediction toner consumption amount calculated by the external controller 404 and the information of the print job. In a print job information display 603, the prediction toner consumption amount, the number of copies, the number of pages, a delivery date, and the like of the job are displayed. In a print costs totalization/display 604, the print costs per, for example, month are totalized from consumables costs of the toner, sheets, and postprocessing apparatuses which were purchased and the total print costs are displayed. In the embodiment, the processes 601 to 604 are executed by, for example, the MIS server 201.

In an image analysis CMYK toner amounts prediction 605, an amount of toner which is consumed by the print job is predicted from the data obtained by performing the RIP to the print job by the external controller 404 and the predicted toner amount is transmitted to the MIS server 201. In a print job page preview 606, an estimation of the toner consumption amount per page can be confirmed. In a print job log display 607, an estimation of the prediction toner consumption amount per print job is displayed in a job log. The print job page preview 606 and the print job log display 607 are executed in the print server 403 or the like and the external controller 404 also has the same functions as those mentioned above.

(Toner Consumption Amount Predicting Mode)

In the system, the toner consumption amount is predicted in the external controller 404 from CMYK images prior to printing. In the case where a charging system according to the toner consumption amount is introduced in the POD site environment 104, the toner consumption amount predicting mode of the external controller 404 is set to "use". The setting is made by a method whereby the client PC is connected to the external controller 404 from the Web browser by HTTP and a log-in is performed as an administrator. When "use" is set, the toner consumption amount is predicted with respect to all of the print jobs. Even when the toner consumption amount predicting mode has been set to "not use", the toner consumption amount of the data before the RIP and the toner consumption amount of the image data after the RIP which exist in a holding queue of the external controller 404 can be predicted. At this time, the data before the RIP and the image data after the RIP which are subjected to the toner consumption amount prediction are designated from a job status 1203 in a job manager 1201, which will be described hereinafter.

(Toner Consumption Amount Prediction and Print Settings)

Prior to describing the toner consumption amount prediction in detail, print settings which should be noted in the toner consumption amount predicting process will be described.

(1) Mail Box Printing

An HDD is built in the high-speed color MFP 405 and the image data subjected to the RIP in the external controller 404 can be stored in a mail box region in the HDD. A mail box print is a function for designating a box number to an output destination and printing the image data stored in the mail box region from an operating unit of the high-speed color MFP 405. In the mail box print, the print settings can be also changed and the printing can be executed. When the toner consumption amount prediction is performed in the box print, the toner consumption amount prediction can be performed in a manner similar to the case where the high-speed color MFP 405 has been designated as an output destination. However, since an actual output is performed by an instruction from the operating unit of the high-speed color MFP 405, the external controller 404 cannot directly notify the MIS server 201 of an output result, the high-speed color MFP 405 notifies the MIS server 201 of the output result.

(2) Form Composition

The form composition is a function for previously registering the image data serving as a form into the HDD in the high-speed color MFP 405, overlaying the image data with image data of a form designated upon printing, and printing a synthetic data. When the toner consumption amount prediction is performed, the form composition is inhibited.

(3) Direct Connection, Print Queue

The direct connection for directly transmitting the image data to the high-speed color MFP 405 after the RIP without passing through a spooler of the external controller 404 and the print queue for starting the printing after the RIP are invalidated and cannot be used when the toner consumption amount prediction is performed.

(Image Analysis CMYK Toner Amount Prediction)

Figure 7:
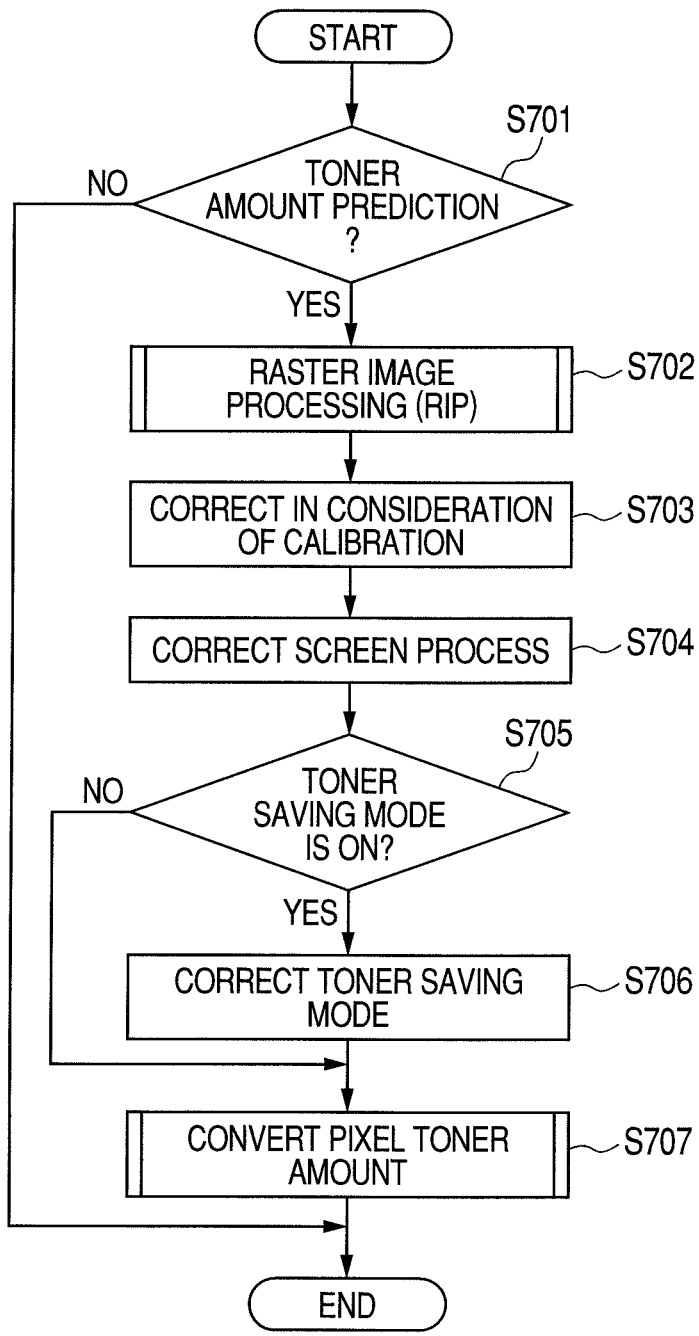
FIG. 7 is a flowchart for describing a toner consumption amount predicting process in the embodiment of the invention.

FIG. 7 is a flowchart for describing a process for prediction of the image analysis CMYK toner amounts.

In S701, whether or not the external controller 404 has been set to the mode for performing the toner consumption amount prediction is discriminated. When the toner consumption amount predicting mode has been set to "use" and when the toner consumption amount prediction has been instructed to the print job, S702 follows. In the other cases, the present processing routine is finished.

In S702, the external controller 404 executes an image development (RIP) to each of the CMYK images of the print job.

In S703, the external controller 404 executes a correction in consideration of a calibration. Generally, when the RIP in S702 is executed, image data to which a result of the calibration has been reflected is produced. However, in the toner consumption amount prediction, since the correction of the calibration is performed in consideration of conditions of the image forming apparatus, it contrarily has an opposite effect. In the external controller, image data adapted to form a desired image is produced in the image forming apparatus according to a certain condition. Therefore, if the image data produced in the external controller by executing the RIP is used for the toner consumption amount prediction as it is, the predicted toner consumption amount differs from the consumption amount of the toner which is actually consumed in the image forming apparatus. Therefore, in the present step, a correction is made so that a calibration result is not reflected, and the image data which has been corrected here and obtained after the RIP and is used for the toner consumption amount prediction.

Figure 8:
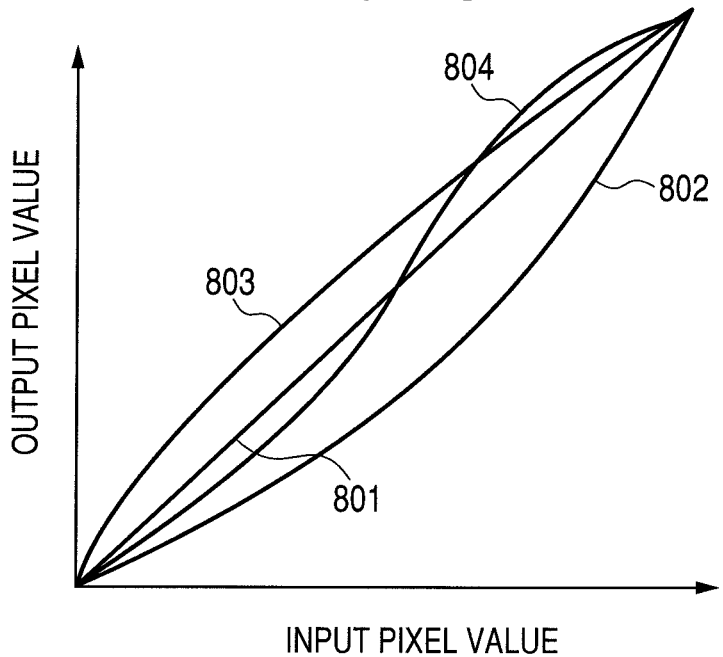
FIG. 8 is a diagram illustrating a screen processing correction in the embodiment of the invention.

In S704, the external controller 404 executes a correction of a screen process. As illustrated in FIG. 8, a lookup table is switched according to settings of a screen set by the print job and the RIP image data is corrected. A lookup table 801 for a default screen, a lookup table 802 for a high-fine screen, a lookup table 803 for a character screen, a lookup table 804 for a photograph screen are illustrated.

Figure 9:
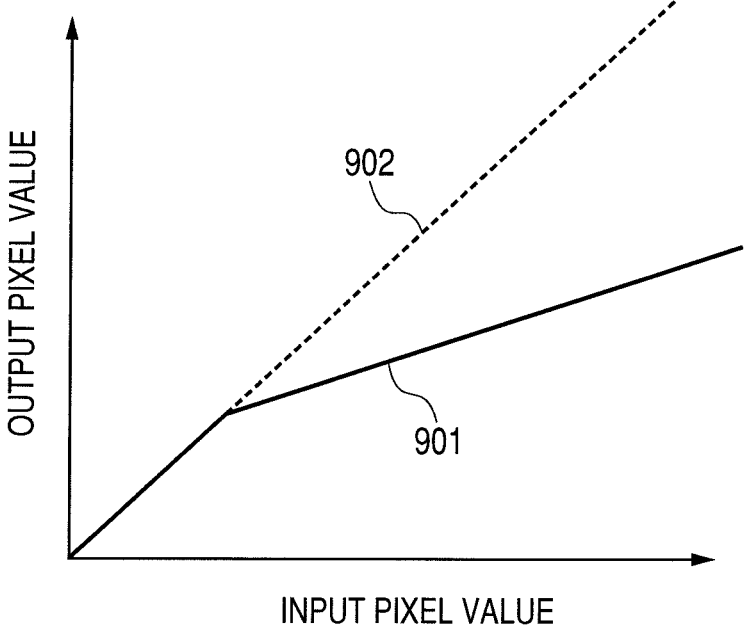
FIG. 9 is a diagram illustrating a toner saving mode correction in the embodiment of the invention.

In S705, the external controller 404 checks the print settings of the job. When a toner saving mode has been set, a toner saving mode correction is made in S706. When the toner saving mode is not set, S707 follows. In the toner saving mode here, the toner amount is controlled in the MFP. Therefore, in S706, the external controller 404 preliminarily corrects the image data after the RIP according to the lookup tables illustrated in FIG. 9 in consideration of a saving amount in the MFP. A lookup table 901 when the toner saving mode is used and a lookup table 902 when the toner saving mode is not used are illustrated.

In a pixel toner amount conversion in S707, the external controller 404 calculates a prediction toner amount of each of CMYK from a pixel value of each page of the image data obtained after the RIP. At the same time, a prediction toner amount of the whole print job is also calculated based on the prediction toner amount of each page.

(Image Developing (RIP) Process)

Figure 10:
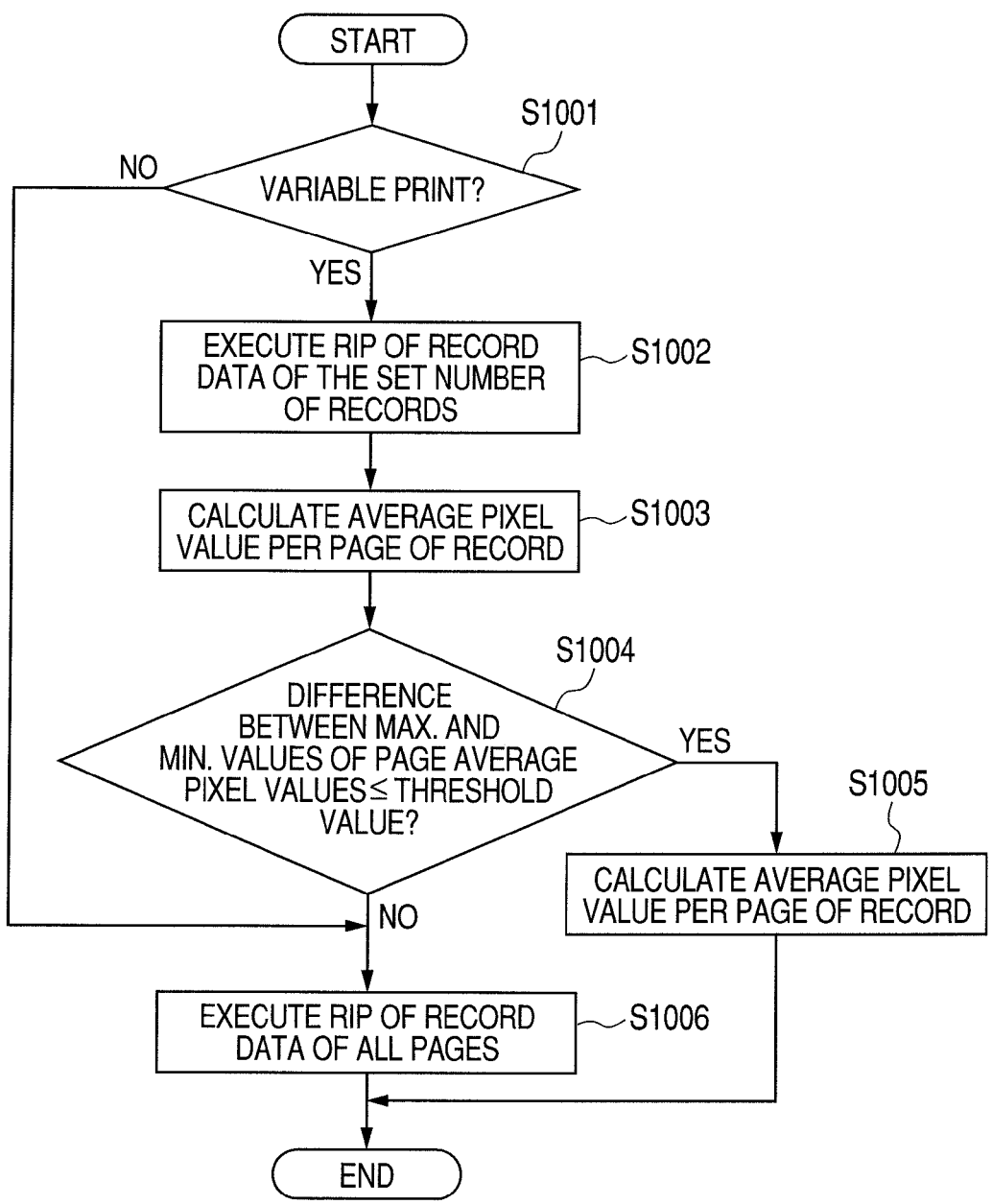
FIG. 10 is a flowchart for describing an image developing process of variable print data in the embodiment of the invention.

A flowchart for describing details of the image developing process in S702 is illustrated in FIG. 10.

In S1001, the external controller 404 discriminates whether or not the print job relates to a variable print using variable data (variable information). If it is not the variable print, S1006 follows. If it is the variable print, S1002 follows.

In S1002, the external controller 404 executes a process for developing record data of the preset number of records into CMYK images. The preset number of records is equal to the number of records which has been set in order to execute a discriminating process, which will be described hereinafter. A default value is equal to 10 records. The number of records can be changed in the setting of the external controller 404.

In S1003, the external controller 404 obtains an average pixel value per page (page average pixel value) on a record unit basis with respect to each record which has been development-processed in S1002. If each record corresponds to a plurality of pages, it is sufficient to divide the sum of the pixel values of a plurality of pages by the number of pages.

In S1004, the external controller 404 discriminates whether or not a fluctuation of the average pixel value per page of a plurality of records which have been development-processed in S1002 is small, that is, whether or not a difference between the maximum value and the minimum value of the page average pixel value is smaller than a threshold value. A default value of the threshold value is equal to 0.5% of the maximum pixel value "255" and can be changed in the setting of the external controller 404.

If the difference is equal to the threshold value or less, S1005 follows and the average pixel value of the records as many as the preset number of records mentioned above in S1002 is calculated. In the toner consumption amount predicting process after S703, the toner consumption amount is calculated by using the average pixel value by multiplying this value by the number of records.

If the difference is larger than the threshold value in S1004, S1006 follows. In S1006, the external controller 404 executes the process for developing the print job into CMYK images in a manner similar to the ordinary printing.

The reason why the above processes are executed in the variable print is that the difference of the images between the records in the variable print is based only on the variable data and it is predicted that the toner consumption amount hardly changes every record. By adding the process as mentioned above, even in such a variable print as to process a large quantity of records, the toner consumption amount prediction in which both of the precision and efficiency are satisfied can be performed without executing the toner consumption amount prediction of all pages. Further, as another method, a method whereby with respect to the fixed information which is common every record, when one record is analyzed, the toner consumption amount prediction is performed, and with respect to other records, the toner consumption amount prediction is performed only for the variable data may be used. In this method, the value calculated in the toner consumption amount prediction of the fixed information of one record can be used for each record. Even in this method, the efficiency is improved as compared with that in the case of executing the toner consumption amount prediction to all data of each page. An expansion regarding such a method will be described hereinafter as another embodiment 2.

(Pixel Toner Amount Conversion)

Figure 11:
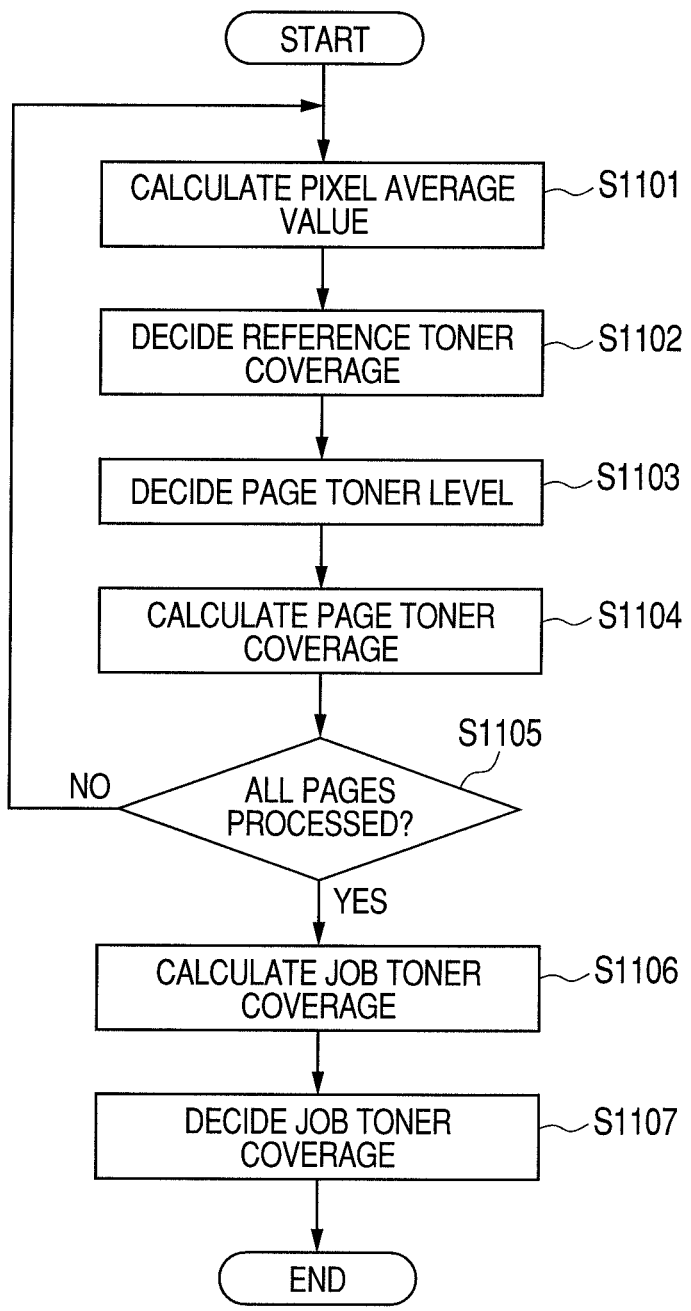
FIG. 11 is a flowchart for describing a pixel toner amount converting process in the embodiment of the invention.

A flowchart for describing details of the pixel toner amount converting process in S707 is illustrated in FIG. 11.

In S1101, the external controller 404 obtains the average value of the pixel values of the pixels in the page. In S1102, the external controller 404 obtains a reference toner coverage by a lookup table from the pixel average value with respect to each of CMYK. A unit of the reference toner coverage is "percentage" and 100% indicates a state where a maximum amount of toner of a certain color has been deposited on the A4 sheet. The lookup table is defined every output apparatus.

In S1103, the external controller 404 decides a page toner level calculated in S1102. Three kinds of levels of high, middle, and low are decided every color of CMYK according to a threshold value which has been predetermined every output apparatus.

In S1104, the external controller 404 calculates a page toner coverage. The page toner coverage denotes an amount of toner which is deposited on the page and is consumed. The page toner coverage is obtained by an equation "(page toner coverage)=(reference toner coverage)×(area ratio to the A4 sheet)". The maximum value of the page toner coverage of the system is equal to about 250% since the maximum number of support sheet is equal to 13×19 sheets. This value is equal to a consumption amount which is about 2.5 times as large as the consumption amount of the maximum amount of toner deposited on the whole surface of the A4 sheet.

In S1105, the external controller 404 discriminates the presence or absence of unprocessed pages. If there are unprocessed pages, the processing routine is returned to S1101. If the processes of all pages have been finished, S1106 follows.

In S1106, the external controller 404 obtains a toner coverage of the whole print job by accumulating the page toner coverages of the respective pages. In S1107, the external controller 404 decides a job toner level (three stages) by using two prepared threshold values from an average reference toner coverage of the page of the print job. The external controller 404 transmits a prediction result of the toner consumption amount to the MIS server 201. In this instance, the job toner level, the toner level of each page, and identification information of the job are mutually associated and transmitted as a prediction result. When the prediction result is transmitted, the calculated job toner coverage and page toner coverage may be transmitted.

(Control for Displaying Result of Toner Consumption Amount)

Figure 12:
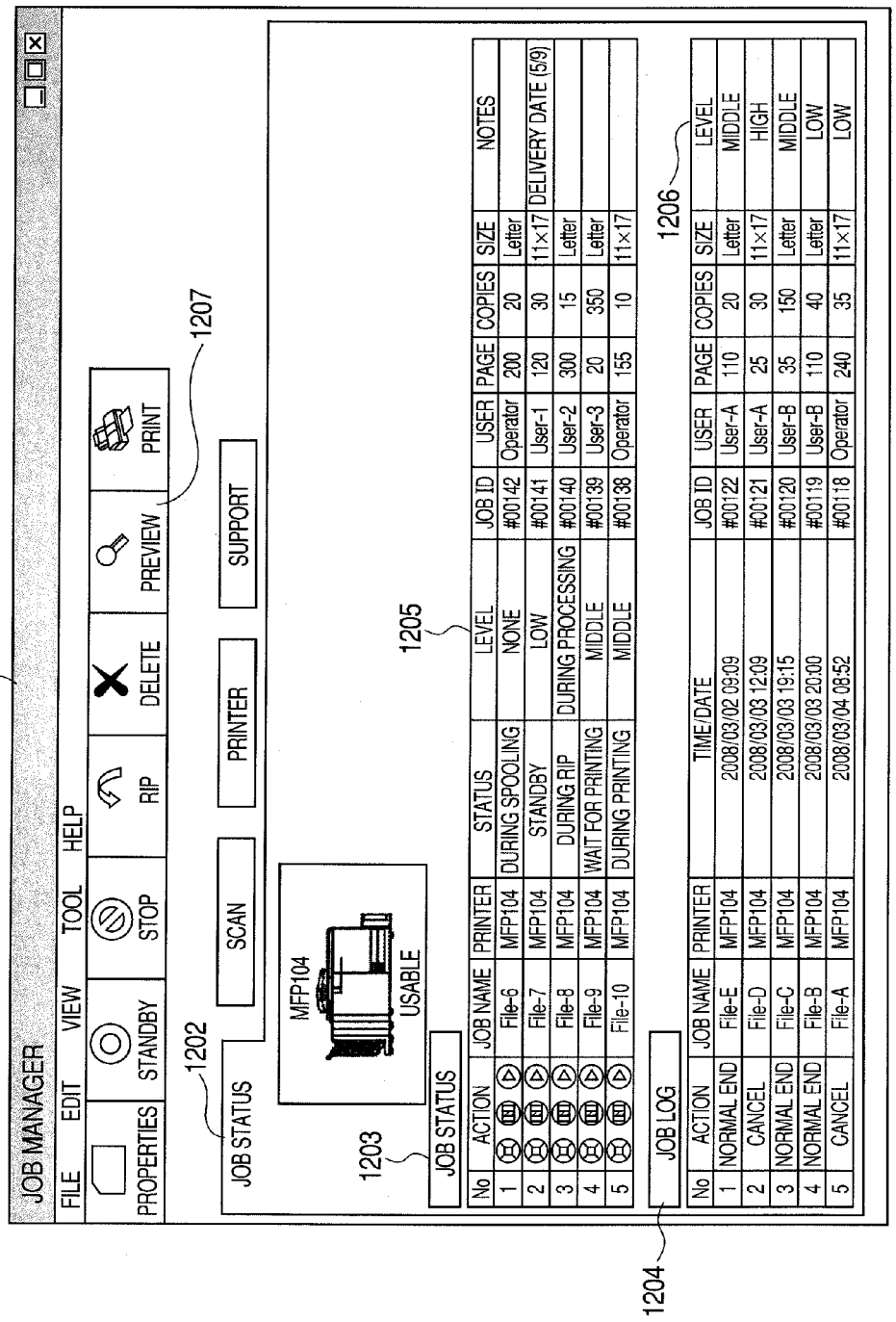
FIG. 12 is a diagram illustrating a job manager in the embodiment of the invention.

FIG. 12 illustrates a display screen according to a job manager (application) who manages the print job on the print server 403. The job manager manages the print job of the image forming apparatus connected to the network 107. The window 1201 of the job manager, a tab 1202 for displaying a job status, the status display portion 1203, and a job log display portion 1204 are illustrated. A "level" display portion 1205 in the status display portion, a "level" display portion 1206 in the job log display portion, and a preview 1207 of the selected job are displayed. The job toner level becomes a prediction result of the toner consumption amount of each job calculated by the toner consumption amount prediction obtained from the external controller 404.

In the status display portion 1203, the job toner level as a result of the toner consumption amount prediction is displayed as a "level" of 1205. Since the job of No. 1 is being spooled at present (before RIP), the level display is "none". Since the job of No. 3 is under the RIP, the level display is "during processing". Like a job of No. 2, an arbitrary job toner level is displayed for the data after the RIP.

In the job log display portion 1204, history information of the print-completed job is recorded and the job toner level of each print job is displayed as "level" in 1206 in the history information.

(Page Toner Level Display)

Figure 13:
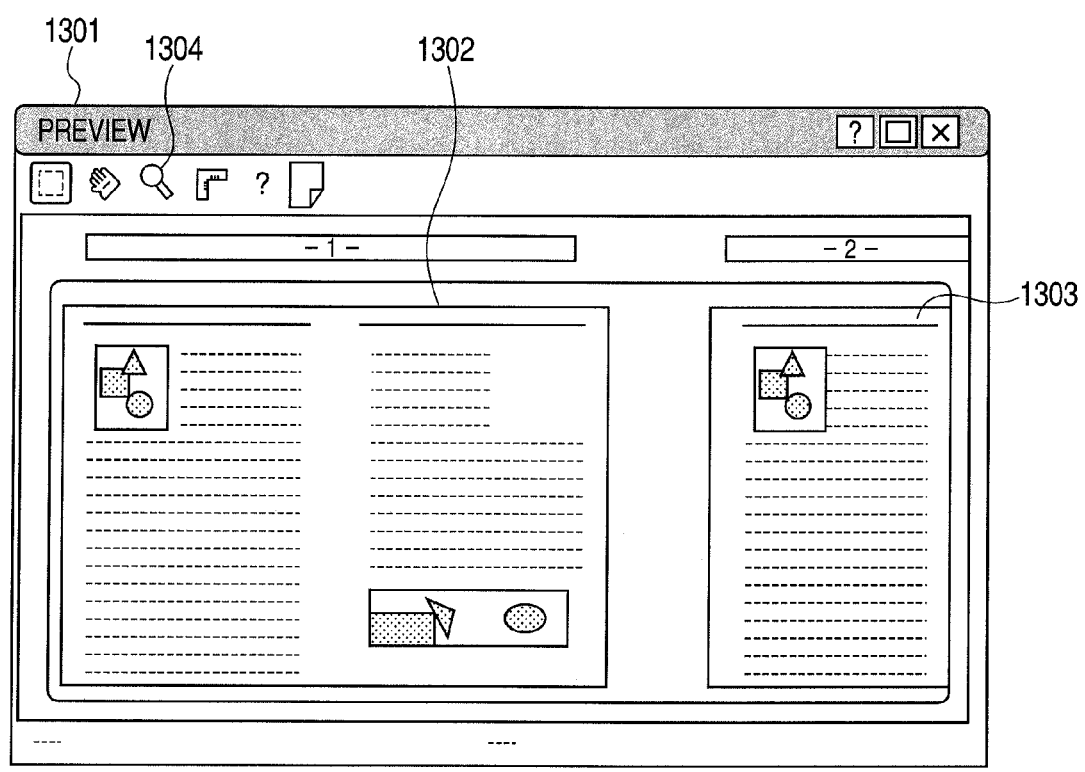
FIG. 13 is a diagram illustrating a preview display in the embodiment of the invention.

FIG. 13 is a diagram of the preview display of the job. A preview window 1301 is illustrated. When the job displayed in the status display portion 1203 or job log display portion 1204 of the job manager 1201 is selected and the preview button 1207 is clicked, it is displayed. One layout page 1302 and a part 1303 of the second page are displayed here. By double-clicking or selecting the one page 1302 and clicking a level display button 1304, a level display window illustrated in FIG. 14 is displayed.

Figure 14:
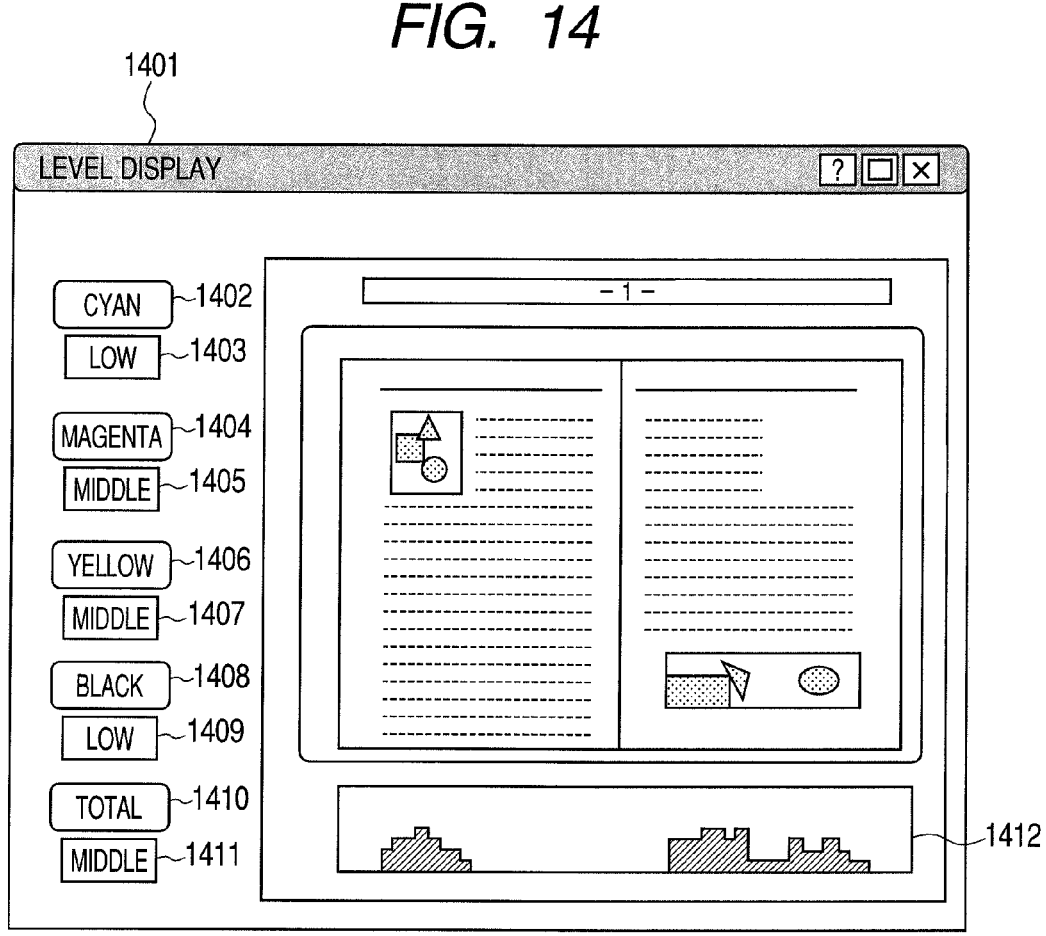
FIG. 14 is a diagram illustrating a level display in the embodiment of the invention.

A level display screen is illustrated in FIG. 14. A level display window 1401, histogram color selecting buttons 1402, 1404, 1406, and 1408 of cyan, magenta, yellow, and black, a total selecting button 1410 for selecting all colors, and toner level display portions 1403, 1405, 1407, 1409, and 1411 are illustrated, respectively. An accumulation value is shown by a graph 1412, in which the pixel value is indicated by a slice in the vertical direction. In FIG. 14, a state where yellow has been selected is illustrated. By seeing the graph 1412, the state of the toner used in the displayed page can be visually grasped.

In the embodiment, the toner consumption amount prediction result is divided and displayed by three levels in order to allow the user to intuitively grasp the toner consumption amount. In the embodiment, a construction in which the number of division levels is changed or the toner consumption amount prediction result is displayed by a numerical value can be also applied. It is also possible to construct in such a manner that the functions by the job manager on the print server 403 are installed in the external controller 404, the information of the prediction result, job history, and the like produced by the external controller is output, and they are displayed and output by using the Web browser equipped for the external apparatus.

(Pod Print Estimation Display)

The toner consumption amount prediction result of the print job is transmitted to the MIS server 201 and an estimated charge is calculated. How the toner consumption amount prediction result is reflected to the estimated charge can be decided by cost information managed in the MIS server 201 by the printing company. There are two kinds of systems: a toner-based charging system in which the charge is set according to the consumption amount of the toner which is used in the print job based on the toner consumption amount prediction; and a toner adjusting system in which the toner consumption amount prediction result is reflected to the charge while the charge per output of one sheet is set to a basic charging method like a conventional manner. The estimation result is transmitted to the accepting server 202 and notified to the print orderer through the Internet 103.

FIG. 15 illustrates an estimation display of the print job of the toner-based charging system. A window 1501 when the print orderer allows the accepting server to display the print estimation by using the browser is illustrated. A Web-entered file name and the number of pages are displayed in 1502. Estimating conditions of the entered print job are displayed in 1503.

A page charge 1504 is set to 200 yen per page. A basic charge 1505 is decided according to the number of copies of the print job. A print fee 1506 is decided based on the costs calculated by the toner consumption amount prediction. A sheet charge 1507 is decided based on the sheet type and the number of print sheets. A post-modification charge 1508 is decided by multiplying a unit price of the saddle stitch binding process by the number of copies in this case FIG. 16 illustrates an estimation display of the print job of the toner adjusting system. A window 1601 when the print estimation is displayed is illustrated. A Web-entered file name and the number of pages are displayed in 1602. Estimating conditions of the entered print job are displayed in 1603.

A page charge 1604 is set to 200 yen per page. A print fee 1605 is decided by multiplying the predetermined charge per color/monochromatic sheet by the number of print sheets based on the print job. In a contents adjustment 1606, the print fee is adjusted based on the costs calculated by the toner consumption amount prediction. That is, in the printing using a large amount of toner, the fee is added, and in the printing in which a large amount of toner is not consumed, the fee is subtracted. In this case, since a sign is minus, this means the printing in which an amount of toner which is used is small. A sheet charge 1607 is decided based on the sheet type and the number of print sheets. A post-modification charge 1608 is decided by multiplying the unit price of the saddle stitch binding process by the number of copies.

When such an estimation is performed, if the user (print orderer) is additionally charged for in the contents adjustment 1606, it is desirable to allow the user to confirm the reason why such a fee is charged for. Therefore, the history information of the relevant job and the information of each page included in the job may be provided to the user so that he can refer to them as illustrated in FIGS. 12 to 14. For example, the levels of the consumed toner of the jobs as estimation targets are enabled to be referred to from the job list in FIG. 12 from the estimation display screens of FIGS. 15 and 16. Further, details of the job is enabled to be referred to. The print orderer is enabled to confirm the level of the toner consumption amount per page illustrated in FIGS. 13 and 14. In this instance, the above processes are realized by a method whereby the MIS server 201 obtains the toner consumption amount prediction results of the job as those estimation targets from the print server 403 and the external controller 404. In the estimation display screens, the page in which the toner consumption amount is particularly large (the toner level is "high") may be provided as a representative page to the print orderer in a preview format together with the toner level.

The print orderer confirms the estimated charge of the ordering server. If there are no problems, he formally orders and the print server 403 starts the printing of the print job.
(Costs Definition for Print Charge Estimation)

To allow the printing company to decide the optimum print charge, a detailed cost management in the MIS server 201 is necessary. FIG. 17 illustrates a costs definition setting display screen of the high-speed color MFP 405. A costs definition window 1701 is illustrated. Basic information regarding the output apparatus is displayed in apparatus information 1702.

Basic information regarding the print costs is defined in a costs definition display 1703. A counter charge 1704 of one sheet upon color printing is displayed and it is also called a click charge. A price 1705 per bottle of the color toner is displayed. Costs 1706 per page of the standard toner coverage (level "middle") are displayed. By using the level of the toner coverage, for example, such control that if the level is "high", the costs are estimated to be slightly large and, if the level is "low", the costs are estimated to be slightly small, or the like can be made.

Second Embodiment

In the foregoing embodiment, the toner consumption amount prediction has been performed with respect to the toner of four colors of CMYK. However, the toner consumption amount can be also predicted with respect to the MFP using toner of a special color in addition to CMYK. For example, transparent toner will be described here. The transparent toner is special toner to produce a glossy printed matter like a photograph by overlappingly coating a color image or the like with the transparent toner. The transparent toner is coated (printed) by a method whereby the whole page surface is coated with the transparent toner or the page surface is partially coated by performing an overlay print or the like by using form data or the like, or the like.
(RIP Process Including Transparent Toner Image)

A case of performing the toner consumption amount prediction by using the MFP which can use the transparent toner in addition to CMYK will now be described. The external controller 404 forms a transparent toner image and realizes the printing using the transparent toner by using the MFP which can register the transparent toner image as form data. An output amount (coating amount) of the transparent toner does not depend on a pixel value of the transparent toner image but is decided by the pixel values of C, M, Y, and K images at the positions on the same image. A method of obtaining the output pixel value of the transparent toner will now be described.

First, the sum of the pixel values of C, M, Y, and K is obtained every pixel. Since the pixel value is an integer of 8 bits and the maximum value of a single color is equal to 255, an addition value of C, M, Y, and K is multiplied by 100/255, thereby setting a resultant value into a total pixel amount (%).

For example, the total pixel amount of a certain pixel (C=80, M=95, Y=140, K=110) is calculated as follows.

$$\text{Total pixel amount}=(C+M+Y+K)\times 100/255=167\% \quad (1)$$

Ordinarily, a general upper limit value of the total pixel amount is equal to about 200 to 280% and depends on a total toner amount which is decided by a construction or the like of an image forming process of the MFP. However, in the construction of the invention, it is required that a total amount obtained after a transparent toner layer was further formed is equal to the upper limit value or less.

Now, assuming that the upper limit value is equal to 240%, it can be considered that a difference between the numerical value in the equation (1) and the upper limit value is equal to a concentration ratio which is permitted in the transparent toner layer. A permission amount in this instance is calculated as follows.

$$\text{Permission amount}=240-167=73\% \quad (2)$$

Therefore, when the pixel value of the transparent toner is calculated, it is equal to 186. It is sufficient that a pixel toner amount conversion is executed by using such a value as a pixel value in a manner similar to each image of CMYK. Naturally, it is needless to say that a threshold value for obtaining a level for the transparent toner, a level display of the transparent toner, and the like are further prepared.

There is such an effect here that the toner consumption amount prediction can be also further performed with respect to a toner image of a special color.

Third Embodiment

A further embodiment will be described here with respect to the toner consumption amount prediction based on the image developing (RIP) process described in FIG. 10 and the like mentioned above.

Figure 18A:
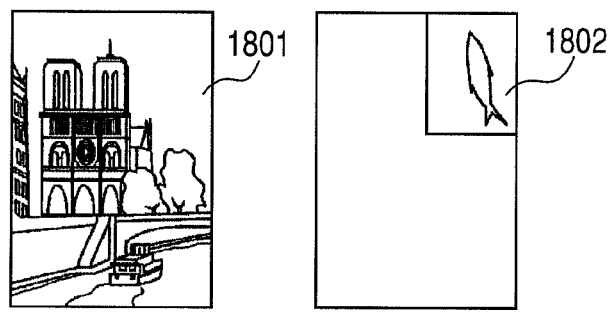
FIGS. 18A, 18B, and 18C are diagrams for describing a toner consumption amount prediction in another embodiment 2 in the invention.
Figure 18B:
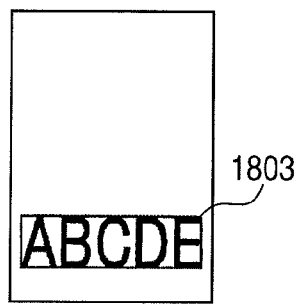
Figure 18C:
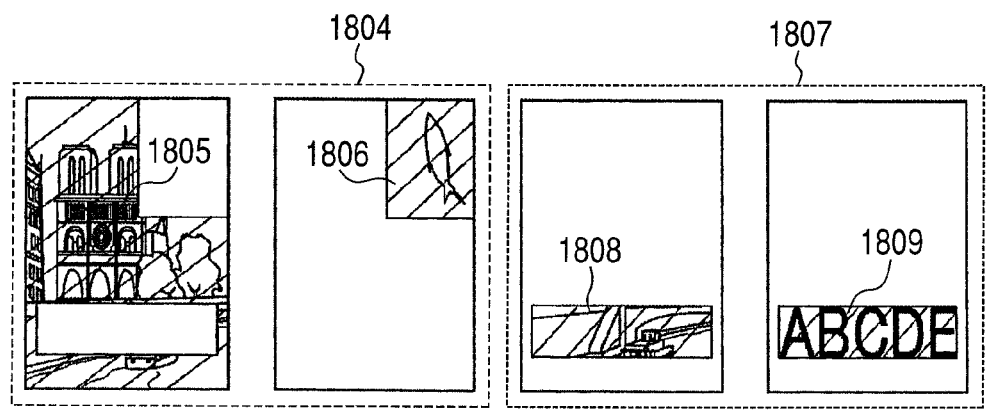

FIGS. 18A to 18C are diagrams for describing the toner consumption amount prediction in the embodiment. FIG. 18A illustrates fixed information (also referred to as master data or reusable data) in the variable print and is an image which is used in common in the print page. FIG. 18B illustrates a region 1803 where variable information (also referred to as variable data) which differs every print page is supplied and a state where specific variable information ("ABCDE") is supplied.

In the embodiment, for example, when the variable print is determined in S1001 in FIG. 10, each of the fixed information and the variable information is subjected to the RIP as mentioned above and the toner consumption amount is predicted. With respect to the fixed information here, once the toner consumption amount prediction has been made, by accumulating the predicted amount the number of times as many as the number of print pages, the whole toner consumption amount prediction can be easily made. With respect to the variable information, the RIP is executed to all data which is supplied to the fixed information and the toner consumption amount prediction is performed.

A case where two kinds of fixed information are used and those fixed information are further synthesized at a position where they overlap as illustrated in FIG. 18A is now considered. In this case, which one of the fixed information is overlaid to a front surface upon synthesis is discriminated from information included in a print instruction. Since the image data which is synthesized to the rear surface of the overlapped region is overwritten by the image data arranged on the front surface, it does not exert an influence on the toner consumption amount prediction in particular. In FIG. 18A, since fixed information 1802 is overlaid to the front surface, with respect to the prediction of the toner consumption amount of the fixed information, with regard to fixed information 1801, the RIP is executed only to a portion excluding the region of the fixed information 1802 and the toner consumption amount is predicted. A value obtained by adding the value of the predicted toner consumption amount and the value of the toner consumption amount of the fixed information 1802 becomes a prediction value of the toner consumption amount in one page of the fixed information.

Subsequently, a case where the information is synthesized to a position where the fixed information and the region 1803 where the variable information is supplied overlap will be considered. In this case, when the toner consumption amount in one page of the fixed information is predicted, a portion excluding the region 1803 where the variable information is supplied is set to a target image of the toner consumption amount prediction. With respect to the prediction of the toner consumption amount of the variable information, the fixed information overlaid to the region 1803 where the variable information is supplied is extracted. The extracted fixed information and the variable information are synthesized, the RIP is executed, and the toner consumption amount is predicted. This process is executed in each page.

FIG. 18C illustrates a specific example of the embodiment. A group 1804 of target images which are used to predict the toner consumption amount in one page of the fixed information is illustrated. Two fixed information 1805 and 1806 are illustrated. A group 1807 of target images which are used to predict the toner consumption amount of the variable information is illustrated. An image 1808 of a partial region of the fixed information and variable information 1809 are illustrated.

Although the example in which the consumption amount is predicted every page has specifically been described in the embodiment, even in the case of predicting the toner consumption amount every record, by executing similar processes, the calculation of the toner consumption amount prediction upon variable printing can be efficiently executed.

Fourth Embodiment

Although the various embodiments have been described in detail above, the invention may be applied to a system constructed by a plurality of equipment or can be also applied to an apparatus constructed by one equipment. For example, the invention may be applied to a computer system including a printer, a facsimile, a PC, a server, and a client, or the like.

The invention is also accomplished by a construction in which software programs for realizing the functions of the foregoing embodiments are supplied to a system or an apparatus directly or from a remote place, and a computer included in the system or the like reads out supplied program codes and executes them.

Therefore, the program codes themselves which are installed into an information processing apparatus in order to realize the functions and processes of the invention by a computer also realize the invention. That is, the program codes themselves for realizing the foregoing functions and processes are one of the invention.

In such a case, a form of the program such as object codes, program which is executed by an interpreter, script data which is supplied to the OS, or the like is not limited so long as the program has a function of the program.

As a recording medium for supplying the program, for example, there is a flexible disk, a hard disk, an optical disk, a magnetooptic disk, an MO, a CD-ROM, a CD-R, a CD-RW, or the like. As a recording medium, there is also a magnetic tape, a non-volatile memory card, a ROM, a DVD (DVD-ROM, DVD-R), or the like.

The program may be downloaded from a Homepage of the Internet by using a browser of the information processing apparatus of the client. That is, the computer program itself of the invention or a compressed file including an automatic installing function may be downloaded from the Homepage into a recording medium such as a hard disk. The invention can be also realized by dividing the program codes constructing the program of the invention into a plurality of files and downloading the respective files from different Homepages. That is, there is a case where a WWW server for allowing a plurality of users to download a program file for realizing the functions and processes of the invention by a computer also becomes a constructing requirement of the invention.

The program of the invention can be encrypted, stored into a storing medium such as a CD-ROM, and distributed to the users. In this case, it is also possible to construct in such a manner that only the users who can clear predetermined conditions are allowed to download key information for decrypting the encryption from a Homepage through the Internet, the encrypted program is decrypted by the key information and executed, and the program is installed into the information processing apparatus.

The computer executes the read-out program, so that the functions of the embodiments mentioned above may be realized. An OS or the like which is operating on the computer may execute a part or all of actual processes based on instructions of the program. Naturally, also in this case, the functions of the embodiments mentioned above can be realized.

Further, the program read out of the recording medium may be written into a memory equipped for a function expanding board inserted in the information processing apparatus or a function expanding unit connected to the information processing apparatus. A CPU or the like equipped for the function expanding board or the function expanding unit may execute a part or all of actual processes based on instructions of the program. There is also a case where the functions of the embodiments mentioned above are realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-113902, filed Apr. 24, 2008, and Japanese Patent Application No. 2008-162308, filed Jun. 20, 2008, which are hereby incorporated by reference herein in their entirety.

The invention claimed is:

1. A print control apparatus for predicting a consumption amount of toner in printing in an image forming apparatus, comprising:
    a development unit that develops a print job in which the printing in the image forming apparatus has been instructed into image data;
    a prediction unit that analyzes the image data obtained by being developed by the development unit and predicts the consumption amount of the toner in the printing; and
    an output unit that outputs a consumption amount of the toner which is consumed by the print job based on the consumption amount of the toner predicted by the prediction unit and a consumption amount of the toner of each page included in the print job,
    wherein in the case where a variable print is instructed by the print job, the prediction unit examines a fluctuation of a prediction value of the toner consumption amount on a record unit basis with respect to a predetermined number of records, when the fluctuation is smaller than a threshold value, the prediction unit calculates an average of the prediction values of the toner consumption amounts of the records of the predetermined number of records and multiplies a value of the calculated average by the number of records designated by the print job, thereby predicting the consumption amount of the toner which is consumed by the print job.

2. A print control apparatus according to claim 1, wherein together with a history of a plurality of print jobs which are printed in the image forming apparatus, the output unit outputs a display screen showing the consumption amount of the toner which is consumed in each of the print jobs included in the history and a display screen showing the consumption amount of the toner of each page included in each print job so that the display screens can be switched.

3. A print control apparatus for predicting a consumption amount of toner in printing in an image forming apparatus, comprising:
    a development unit that develops a print job in which the printing in the image forming apparatus has been instructed into image data;
    a prediction unit that analyzes the image data obtained by being developed by the development unit and predicts the consumption amount of the toner in the printing; and
    an output unit that outputs a consumption amount of the toner which is consumed by the print job based on the consumption amount of the toner predicted by the prediction unit and a consumption amount of the toner of each page included in the print job, wherein
    in the case where a variable print is instructed by the print job,
    in fixed information which is common in each record of the print job, the development unit develops the fixed information of one record into the image data, and in variable information which differs in each record of the print job, the development unit develops the variable information of all records included in the print job into the image data, and
    the prediction unit adds a value obtained by multiplying a prediction value of the consumption amount of the toner of each color in the printing which was predicted by analyzing the image data corresponding to the fixed information obtained by being developed by the development unit by the number of records designated by the print job and a prediction value of the consumption amount of the toner of each color in the printing which was predicted by analyzing the image data corresponding to the variable information of each record obtained by being developed by the development unit, thereby predicting the consumption amount of the toner which is consumed by the print job.

4. A print control apparatus according to claim 3, wherein in the case where regions where a plurality of fixed information which are common in each record are synthesized overlap upon printing,
    the prediction unit sets the image data corresponding to the fixed information which is synthesized to a front surface among the plurality of fixed information and the image data excluding the region where the fixed information of the image data corresponding to the fixed information which is synthesized to a rear surface overlaps into image data which is common in each record of the print job, and analyzes the image data which is common in each record, thereby predicting the consumption amount of the toner in the printing.

5. A print control apparatus according to claim 3, wherein in the case where regions where the fixed information and the variable information are synthesized overlap upon printing,
    the prediction unit sets the image data in the regions excluding the region overlapped with the variable information in the image data corresponding to the fixed information into image data which is common in each record of the print job, and analyzes the image data which is common in each of the records, thereby predicting the consumption amount of the toner in the printing, and
    the prediction unit sets image data obtained by synthesizing the image data corresponding to the variable information of each of the records and the image data corresponding to the fixed information in the region overlapped with the variable information into image data which differs in each record of the print job, and analyzes the image data which differs in each of the records, thereby predicting the consumption amount of the toner in the printing.

6. A print control apparatus for predicting a consumption amount of toner in printing in an image forming apparatus, comprising:

a development unit that develops a print job in which the printing in the image forming apparatus has been instructed into image data;

a prediction unit that analyzes the image data obtained by being developed by the development unit and predicts the consumption amount of the toner in the printing; and an output unit that outputs a consumption amount of the toner which is consumed by the print job based on the consumption amount of the toner predicted by the prediction unit and a consumption amount of the toner of each page included in the print job, wherein the prediction unit predicts the consumption amount of the toner based on image data obtained by executing a correcting process regarding the printing in the image forming apparatus to the image data obtained by being developed by the development unit, and wherein the correcting process is a correcting process based on at least one or more of a calibration, a screen process, and a toner saving mode.

7. A print control method in a print control apparatus for predicting a consumption amount of toner in printing in an image forming apparatus, comprising:

a development step of developing a print job in which the printing in the image forming apparatus has been instructed into image data;

a prediction step of analyzing the image data obtained by being developed in the development step and predicting the consumption amount of the toner in the printing; and an output step of outputting a consumption amount of the toner which is consumed by the print job based on the consumption amount of the toner predicted in the prediction step and a consumption amount of the toner of each page included in the print job, wherein in the prediction step, in the case where a variable print is instructed by the print job, a fluctuation of a prediction value of the toner consumption amount on a record unit basis is examined with respect to a predetermined number of records, when the fluctuation is smaller than a threshold value, an average of the prediction values of the toner consumption amounts of the records of the predetermined number of records is calculated, and a value of the calculated average is multiplied by the number of records designated by the print job, thereby predicting the consumption amount of the toner which is consumed by the print job.

8. A print control method according to claim 7, wherein in the output step, together with a history of a plurality of print jobs which are printed in the image forming apparatus, a display screen showing the consumption amount of the toner which is consumed in each of the print jobs included in the history and a display screen showing the consumption amount of the toner of each page included in each print job are output so that the display screens can be switched.

9. A non-transitory computer-readable recording medium which stores computer executable code of a program for allowing a computer to execute the print control method according to claim 7.

10. A print control method in a print control apparatus for predicting a consumption amount of toner in printing in an image forming apparatus, comprising:

a development step of developing a print job in which the printing in the image forming apparatus has been instructed into image data;

a prediction step of analyzing the image data obtained by being developed in the development step and predicting the consumption amount of the toner in the printing; and an output step of outputting a consumption amount of the toner which is consumed by the print job based on the consumption amount of the toner predicted in the prediction step and a consumption amount of the toner of each page included in the print job, wherein in the case where a variable print is instructed by the print job, in the development step, in fixed information which is common in each record of the print job, the fixed information of one record is developed into the image data, and in variable information which differs in each record of the print job, the variable information of all records included in the print job is developed into the image data, and in the prediction step, a value obtained by multiplying a prediction value of the consumption amount of the toner of each color in the printing which was predicted by analyzing the image data corresponding to the fixed information obtained by being developed in the development unit by the number of records designated by the print job and a prediction value of the consumption amount of the toner of each color in the printing which was predicted by analyzing the image data corresponding to the variable information of each record obtained by being developed in the development unit are added, thereby predicting the consumption amount of the toner which is consumed by the print job.

11. A print control method according to claim 10, wherein in the case where regions where a plurality of fixed information which are common in each record are synthesized overlap upon printing, in the prediction step, the image data corresponding to the fixed information which is synthesized to a front surface among the plurality of fixed information and the image data excluding the region where the fixed information of the image data corresponding to the fixed information which is synthesized to a rear surface overlaps are set into image data which is common in each record of the print job, and the image data which is common in each record is analyzed, thereby predicting the consumption amount of the toner in the printing.

12. A print control method according to claim 10, wherein in the case where regions where the fixed information and the variable information are synthesized overlap upon printing, in the prediction step, the image data in the regions excluding the region overlapped with the variable information in the image data corresponding to the fixed information is set into image data which is common in each record of the print job, and the image data which is common in each of the records is analyzed, thereby predicting the consumption amount of the toner in the printing, and image data obtained by synthesizing the image data corresponding to the variable information of each of the records and the image data corresponding to the fixed information in the region overlapped with the variable information is set into image data which differs in each record of the print job, and the image data which differs in each of the records is analyzed, thereby predicting the consumption amount of the toner in the printing.

13. A print control method in a print control apparatus for predicting a consumption amount of toner in printing in an image forming apparatus, comprising:

a development step of developing a print job in which the printing in the image forming apparatus has been instructed into image data;

a prediction step of analyzing the image data obtained by being developed in the development step and predicting the consumption amount of the toner in the printing; and an output step of outputting a consumption amount of the toner which is consumed by the print job based on the consumption amount of the toner predicted in the prediction step and a consumption amount of the toner of each page included in the print job, wherein in the prediction step, the consumption amount of the toner is predicted based on image data obtained by executing a correcting process regarding the printing in the image forming apparatus to the image data obtained by being developed in the development unit, and wherein the correcting process is a correcting process based on at least one or more of a calibration, a screen process, and a toner saving mode.

* * * * *